United States Patent [19]
Talbott

[11] Patent Number: 5,232,248
[45] Date of Patent: * Aug. 3, 1993

[54] MAILING DEVICE

[76] Inventor: Alex F. Talbott, 3703 Hillsdale Rd., Louisville, Ky. 40222

[*] Notice: The portion of the term of this patent subsequent to Nov. 24, 2009 has been disclaimed.

[21] Appl. No.: 951,144

[22] Filed: Sep. 25, 1992

Related U.S. Application Data

[63] Continuation of Ser. No. 544,677, Jun. 27, 1990, Pat. No. 5,165,726, which is a continuation-in-part of Ser. No. 240,796, Sep. 6, 1988, Pat. No. 4,945,218.

[51] Int. Cl.⁵ .............................................. B42D 15/00
[52] U.S. Cl. ..................................... 283/81; 229/300; 283/62; 283/67; 283/116; 283/117
[58] Field of Search ............... 229/302, 300, 303, 306; 283/57, 62, 58, 67, 79, 81, 80, 116, 115, 117

[56] References Cited

U.S. PATENT DOCUMENTS

| | | |
|---|---|---|
| 86,722 | 4/1869 | Klaucke et al. ................ 229/300 X |
| 892,675 | 7/1908 | Morrison ............................. 283/116 |
| 2,157,740 | 5/1939 | Quinlan .......................... 229/300 X |
| 2,563,340 | 8/1951 | Kelly ............................... 229/300 X |
| 3,164,317 | 7/1965 | Bogen ................................... 229/300 |
| 4,272,327 | 6/1981 | Logan ................................ 283/62 X |
| 4,277,089 | 7/1981 | Lockhart ........................... 283/81 X |
| 4,358,017 | 11/1982 | Erikson ............................. 209/584 |
| 4,445,635 | 5/1984 | Barr ....................................... 229/73 |
| 4,535,204 | 8/1985 | Hughes et al. ........................ 179/90 |
| 4,565,317 | 1/1986 | Kranz ................................... 229/73 |
| 4,706,877 | 11/1987 | Jenkins . |
| 4,778,100 | 10/1988 | McGuire et al. .................... 229/303 |
| 4,993,752 | 2/1991 | Juszak ............................. 229/300 X |

OTHER PUBLICATIONS

3M Post-It Brand Products brochure and Dec. 8, 1988 letter; stating "©3M 1988".
Ward/Kraft Business Forms Division forms and label; no date indicated.
Collection of 10 forms including "Parkside Health Management Corporation" form; stating "P01-002 7/86".
PERMACARD Item No. C-BPC sheet.

Primary Examiner—Paul A. Bell
Attorney, Agent, or Firm—Woodard, Emhardt, Naughton, Moriarty & McNett

[57] ABSTRACT

A mailing device and method including a bar coded return label removably mounted to the original communication, but attachable to a return envelope supplied by the recipient. An original document includes a letterhead having the label removably mounted thereto which duplicates the identity of the sender in both written and bar coded data appearing beneath the label on the letterhead. The label includes self-adhesive allowing the label to be removed from the document and mounted to a return envelope identifying the original sender. The removable stickers may be shaped as a business card and arranged in a vertical stack. Account indicia are printed on the label for payment of document delivery fees, such as postal fees, by the sender. Instructions are set forth on the sticker backing.

17 Claims, 6 Drawing Sheets

MAILING DEVICE

REFERENCE TO RELATED APPLICATIONS

This application is a continuation of U.S. patent application Ser. No. 544,677, filed on Jun. 27, 1990 now U.S. Pat. No. 5,165,726 and entitled MAILING DEVICE AND BUSINESS CARD COMBINATION which is a continuation-in-part of U.S. Pat. No. 4,945,218, filed Sept. 6, 1988 and issued Jul. 31, 1990 by the same inventive entity, and entitled MAILING DEVICE AND MACHINE-READABLE BUSINESS CARD.

BACKGROUND OF THE INVENTION

This invention is in the field of document delivery devices such as mailing devices utilizing a message sheet and envelope, and more particularly a coded mailing device to facilitate machine sorting.

Description of the Prior Art:

Standard bar coding has been established in the merchandising field to allow automatic reading of the data represented by the code. For example, U.S. Pat. No. 4,535,204 issued to Hughes, et al. discloses a self-adhesive label mounted to a document with the label having a telephone number in bar code form. Mailing address information has also been represented by bar codes printed on envelopes such as disclosed in U.S. Pat. No. 4,565,317 issued to Kranz. Another example of optical character recognition markings being printed directly on the envelope is shown in U.S. Pat. No. 4,445,635 issued to Barr.

Typically, the sender of correspondence such as a bill or statement includes within the original envelope a return envelope to facilitate return of a check or money order by the recepient. The return envelope must be pre-printed with the sender's address and in many cases contains the optical character or bar coded information associated with the sender's address. The pre-printing of the return envelope, as well as the inclusion of the return envelope in the original envelope, adds to the mailing cost. As such, there is a need for a means to provide the recipient with the bar coded information of the sender's address without including a return envelope in the sender's original envelope. Disclosed herein is such a mailing device.

My mailing device includes a sticker or label removably mounted to the original statement or stationary duplicating the letterhead appearing thereon which also includes bar coded address information. The recipient may then remove the label and attach the label to a return envelope supplied by the recipient providing automatically for the bar coded information corresponding to the original sender's address. Peel-off labels incorporating bar code information are previously known such as disclosed in U.S. Pat. No. 4,272,327 issued to Logan; however, a mailing device including a return envelope and original sender's stationary with peel-off letterhead label has not been previously known. Another version of a peel-off label is shown in U.S. Pat. No. 4,706,877 issued to Jenkins.

The removable paper sticker may also include the phone number of the presenter and therefore be removed from the letterhead and mounted at a convenient location adjacent a phone to allow for recall of the presenter's phone number. Further, the stickers may be shaped as a business card and may be arranged in a vertical stack and removed therefrom to be mounted to a return envelope. Thus, the sticker can serve as a combination business card and return address sticker.

SUMMARY OF THE INVENTION

One embodiment of the present invention is a mailing combination with separable return label comprising a paper sheet including an addressor's section with a first portion to identify the addressor in written words, a removable paper sticker mounted atop the addressor's section and having a bottom surface and an outwardly facing top surface, the sticker having a return section thereon identifying the addressor in pre-printed written words, and, adhesive means on the bottom surface operable to allow the sticker to be removed from the paper sheet by the addressee and to then mount the sticker onto a return envelope utilizing the identity of the addressor on the sticker to mail to the same addressor.

Another embodiment of the present invention is a method of mail communication comprising the steps of providing a paper sheet having a first letterhead section identifying the original sender and further having a message section to contain a message to the original recipient, mounting a sticker removable atop the first letterhead section and concealing same until removed, the sticker including a second letterhead section identifying the original sender in pre-printed written words, mailing the paper sheet with the sticker mounted thereon in a first envelope to the recipient, opening the first envelope, removing the sticker from the paper sheet, mounting the sticker onto a return envelope provided by the recipient, and, mailing the return envelope back to the original sender.

One object of the present invention is to provide the foregoing including account indicia for debiting an account of the original sender for postal fees.

A further embodiment of the present invention is a business card for dispatch to a recipient from a presenter comprising a sheet sized as a business card and containing indicia thereon identifying the presenter in pre-printed written words and having account indicia thereon, and, adhesive means on the sheet operable to removably mount the sheet to an item supplied by the recipient.

A further object of the present invention is to provide a new and improved mailing device including means for automatically addressing the return message without requiring inclusion of a return envelope.

An additional object of the present invention is to provide an improved method of mail communication allowing for the pre-addressing of a return message in bar coded form without including a return envelope with the original message.

Yet a further object of the present invention is to provide a combined business card and return address sticker.

Another object of the present invention is to provide means for encouraging use of bar coded mail by the U.S. Post Office thereby eventually reducing postage.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown the mailing device 10 which is the preferred embodiment of the present invention. The mailing device includes a conventional envelope 11 having the standard construction and with the flap 12 shown fragmented to illustrate the envelope as enclosing my new document 13 having a removable sticker 14 mounted atop the letterhead of the document. Envelope 11 has printed thereon the name and address of the sender in the sender portion 15 in the upper left hand corner, whereas the name and address of the recipient is printed in the recipient section 16 located in the center of the envelope.

Figure 1:
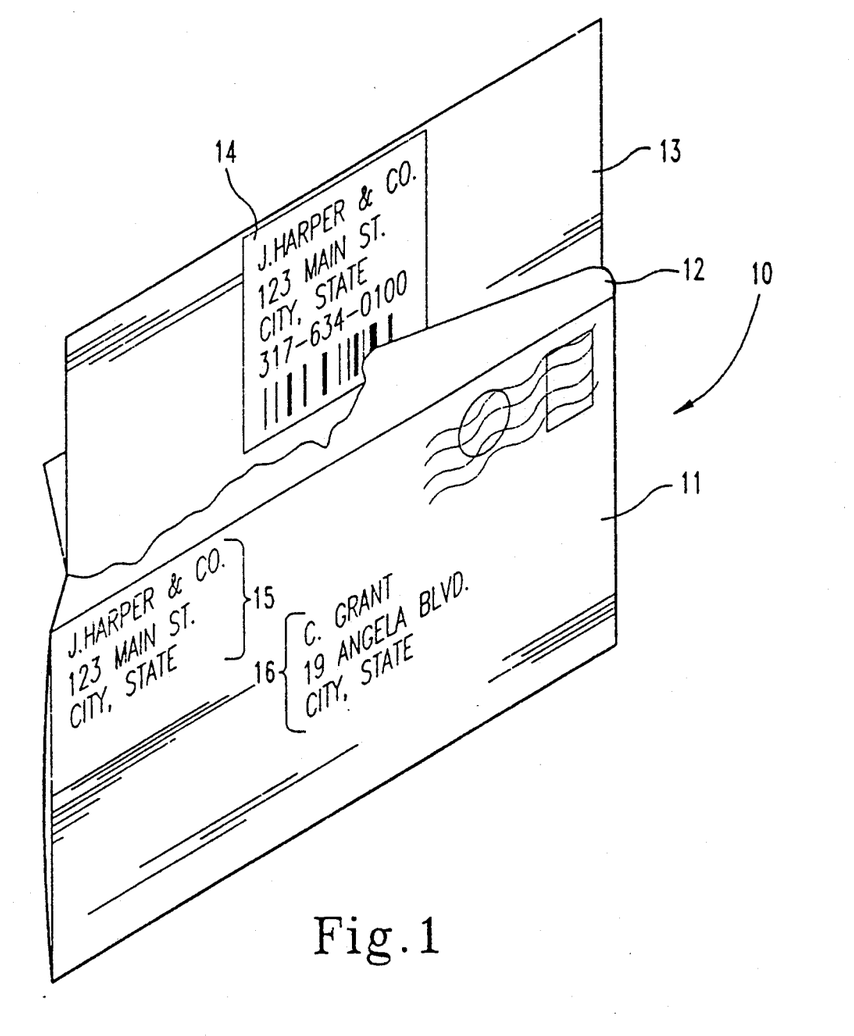
FIG. 1 is a fragmentary perspective view of the mailing device incorporating the present invention.
Figure 2:
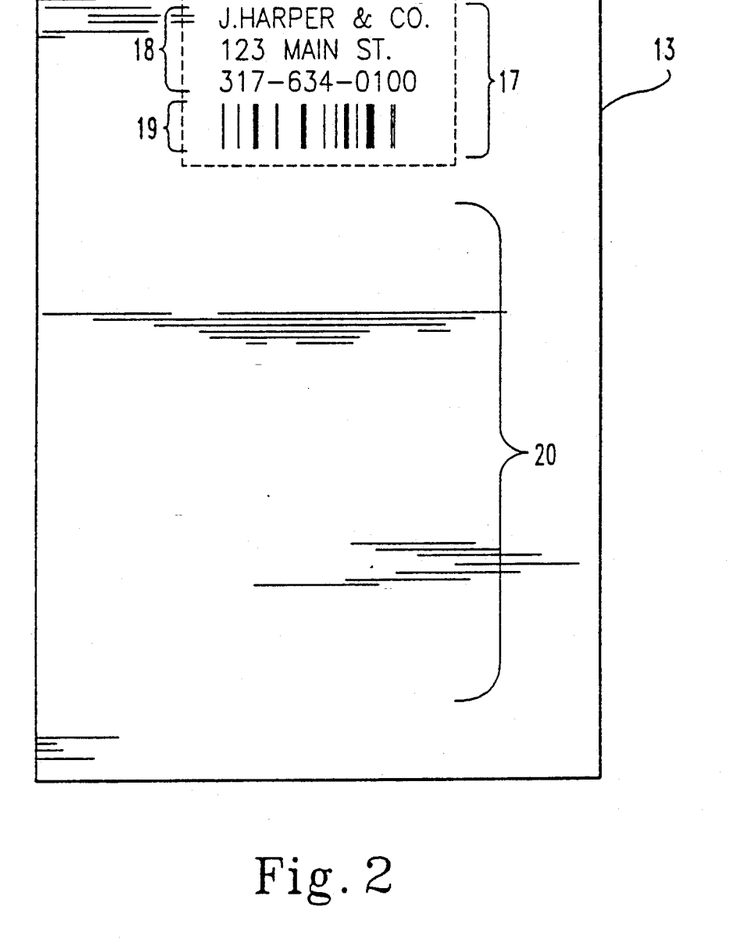
FIG. 2 is a front view of the document included in the envelope shown in FIG. 1.
Figure 3:
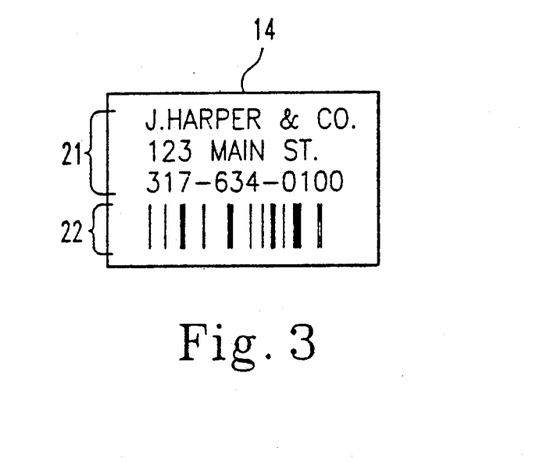
FIG. 3 is a front view of the removable sticker mounted atop the document shown in FIG. 1.

Document 13 is shown in FIG. 1 with the removable sticker 14 of FIG. 3 mounted atop the letterhead, whereas document 13 is shown in FIG. 2 with the sticker removed revealing the letterhead having the same information as contained on the removable sticker. Document 13 may be produced from paper and has a letterhead or addresser section 17 identifying the addresser or sender in both printed or written words and in machine-readable or optical characters. Section 17 identifies the name, address and phone number of the sender in written or printed words in the top portion 18 of the letterhead whereas the name and address of the sender is repeated in machine-readable bar code in the lower portion 19 of the letterhead. The bar code identifies the original sender of the label to allow the recipient mailing the return envelope to deposit the return envelope into the United States mail without affixing the necessary postage, with the U.S. Post Office then reading the information and collecting the postage due from the original sender. The notation "Mailing Label. No Postage Needed" could appear at the bottom of the label. Immediately beneath the letterhead is the main portion 20 of the document in which the sender may print or write a message.

Figure 4:
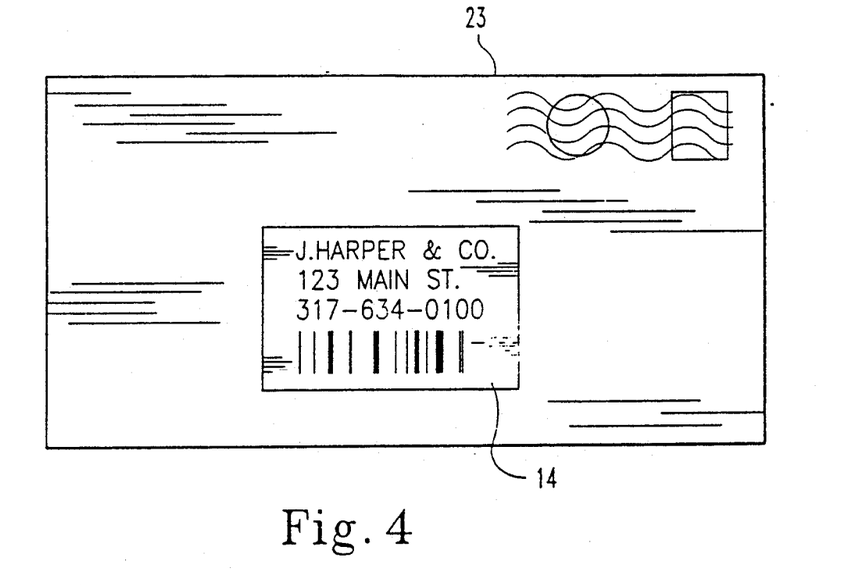
FIG. 4 is a front view of a return envelope having mounted thereon the sticker of FIG. 3.

The removable paper sticker 14 has an outwardly facing top surface upon which is duplicated the information contained in the letterhead section 17 of document 13. Thus, the name, address and phone number of the sender is printed in the top section 21 of the sticker whereas the name and address of the sender is also included in machine-readable bar code in the bottom section 22 of the sticker. The printing in section 21 and 22 is of the same size and spacing as the information contained in section 18 and 19. Thus, sticker 14 may be mounted atop letterhead section 17 providing an appearance of being the letterhead for the document. The bottom surface of sticker 14 is provided with conventional self-adhesive to allow for the mounting and subsequent removal of the sticker. Further, the self-adhesive allows for the removed sticker 14 to then be mounted to a return envelope supplied by the recipient of document 13 thereby automatically addressing the return envelope. That is, sticker 14 may be removed from document 13 and then mounted in the center portion of return envelope 23 (FIG. 4) supplied by the recipient of envelope 11. In such a manner, the sender of envelope 11 and document 13 does not have to include a return envelope within envelope 11 thereby minimizing the cost associated with the device. Further, by providing sticker 14 to the recipient, a means is provided for automatically addressing the return envelope 23.

By pre-printing the identity of the sender in both written words and in machine-readable code, and by sizing the information on sticker 14 in the same manner as the information is sized in the letterhead of document 13, the sticker conceals the information contained in letterhead section 17 and is positioned approximately over the dashed line configuration as shown in FIG. 2. The sticker provides in combination with document 13 and the two envelopes a new and improved method of mail communication. The method includes the step of first mounting the sticker removably atop letterhead section 17 of document 13 to conceal same until removed. The paper document 13 is then enclosed in envelope 11 and mailed to the recipient who then opens the envelope and removes the document therefrom to read the message contained in section 20. In the event communication is then desired from the recipient to the sender, the recipient removes sticker 14 from document 13 and mounts the sticker onto return envelope 23 which is provided by the recipient to utilize the identity of the original sender in both machine-readable bar code and in printed words, thereby automatically addressing the return envelope. A communication or message is then inserted into envelope 23 and the envelope is then mailed to the original sender.

It will be obvious from the above description that the present invention provides a new and improved mailing device and method of mail communication. It will be further obvious from the above description that the mailing device disclosed herein provides for an automatic means of pre-addressing a return envelope even though the return envelope is supplied by the recipient of the original communication.

Figure 5:
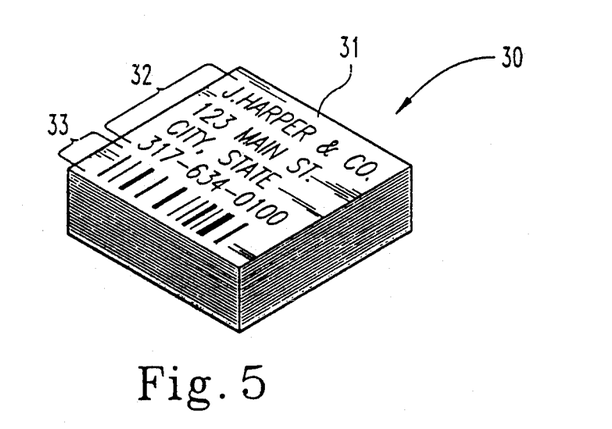
FIG. 5 is a perspective view of a stack of business cards incorporating the present invention.
Figure 6:
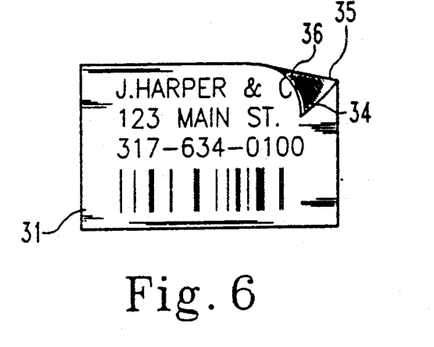
FIG. 6 is a top view of one of the cards shown in the stack of FIG. 5 and with the corner turned to illustrate the adhesive positioned on the back thereof.

The removable paper sticker 14 may be shaped as a business card and arranged in a vertical stack 30 (FIG. 5). Thus a plurality of cards may be removed one at a time on an as-needed basis. The top card 31 includes an address section 32 which identifies the name and address of the presenter and likewise may include the phone number of the presenter. This information is then duplicated in the bar coded section 33 immediately adjacent and beneath section 32. Conventional self-adhesive 36 is provided on the back surface 35 of card 31 with the corner 34 of the card turned in FIG. 6 to more clearly illustrate the backside thereof.

The business cards shown in stack 30 have the same information as sticker 14 with the indicia provided on the upwardly facing surface of each card and the adhesive means provided on the downwardly facing surface of each card. The phone number of the presenter of the card is included in the indicia to allow the recipient of the card to mount the card at a location near a phone for recall of the phone number. Likewise, the card may be removably mounted to a return envelope supplied by the recipient of the card utilizing the indicia to identify the original presenter of the card. Each business card in stack 34 is therefore actually a combination business card and return address sticker. The bar coded information in section 33 of the business card identifies the original presenter of the card to allow the recipient or the person or entity mailing the return envelope to deposit the return envelope into the United States mail without affixing the necessary postage with the U.S. Post Office then reading the information contained in section 33 and collecting the postage due from the person identified on the card which is the original presenter of the card. The notation "Mailing Label. No Postage Needed" could appear at the bottom of the card.

Figure 7A:
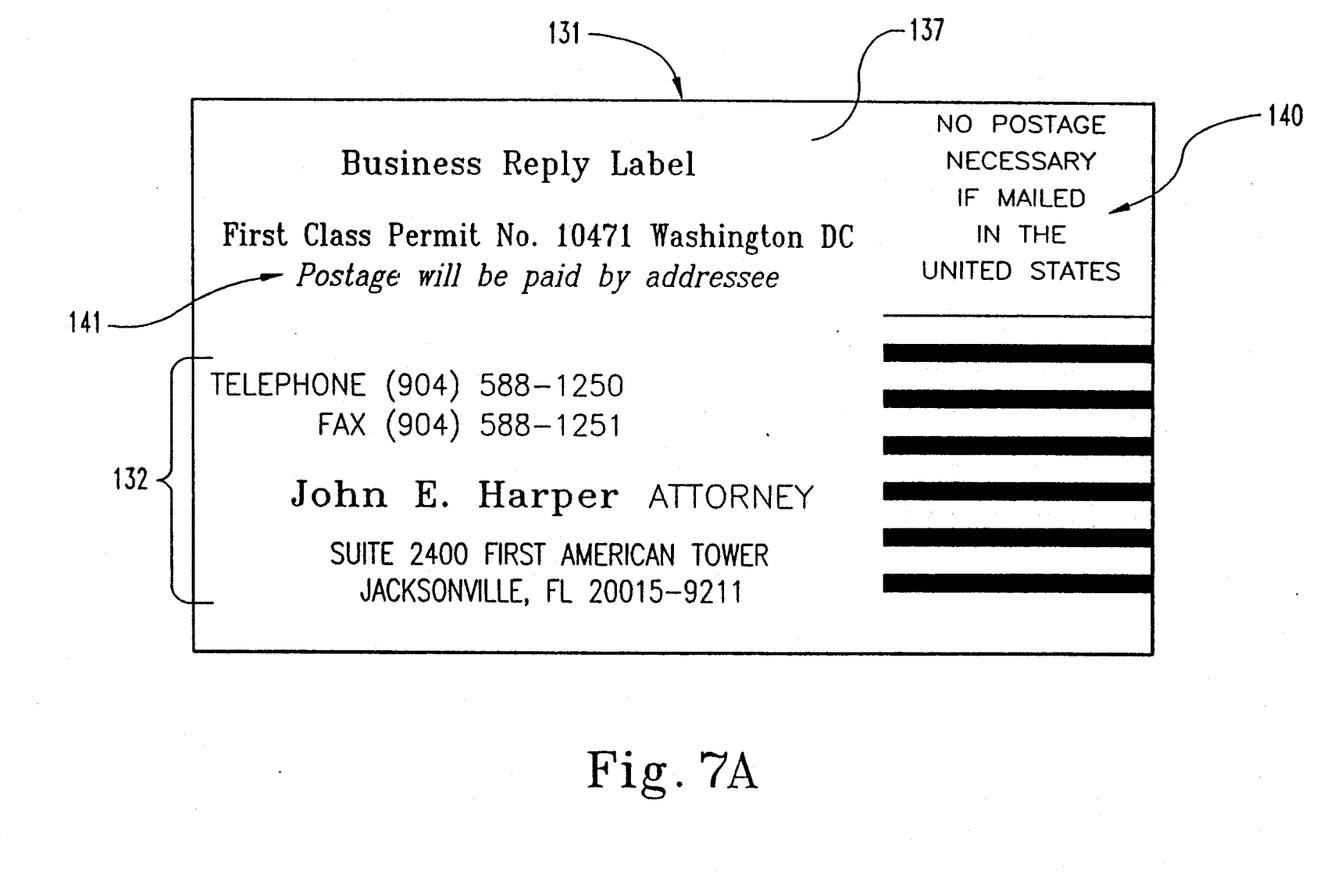
FIG. 7A is a top view of another embodiment of a business card incorporating the present invention.
Figure 7B:
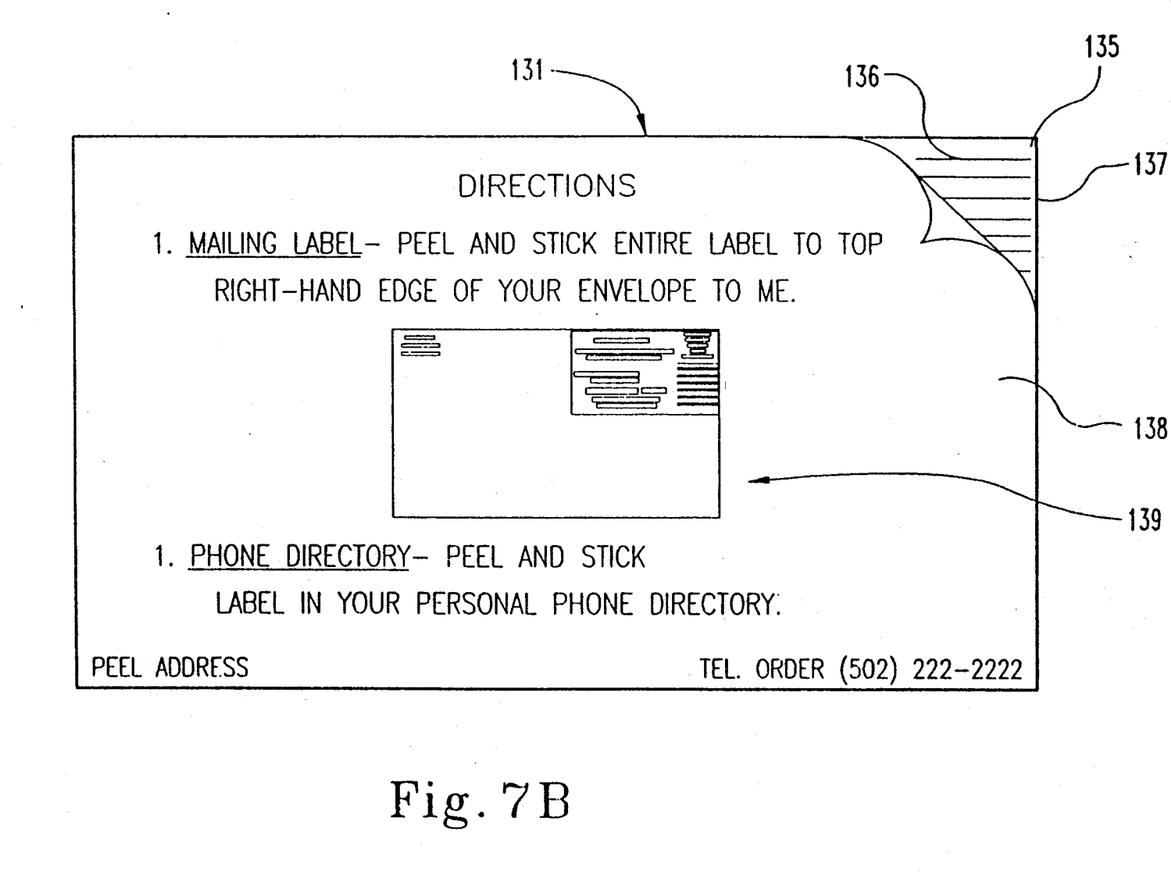
FIG. 7B is a bottom view of the card of FIG. 7A having a corner of its backing peeled to illustrate the adhesive positioned on the back thereof.

One such device is illustrated in FIG. 7A and FIG. 7B. Business card 131 has a front card 137 having adhesive 136 along back surface 135 thereof. A peel-away backing 138 is adhered to adhesive 136. FIG. 7B shows backing 138 peeled slightly back in the upper right-hand corner thereof to illustrate adhesive 136.

Front card 137 includes address section 132 which identifies the presenter. Such identification may take the form of the name, street address, zip code, telephone number and/or facsimile number as illustrated. Accordingly, section 132 provides presenter identifying information printed thereon allowing card 131 to be used as a business card. Preferably, the mailing address in section 132 is located in the lower left-hand corner of card 137 with indicia 140 located in the upper right-hand corner as illustrated. Card 131 including front card 137 and peelaway backing 138 are sized like a standard business card, preferably about 3½" wide by 2" high.

Front card 137 further has indicia 140 and indicia 141 for facilitating the use of a postage permit for debiting an account of the addressee identified in section 132. Indicia 140 preferably includes the horizontal striping as illustrated in FIG. 7A as set forth in postal regulations for postal permit use. Thus, this feature in combination with the size of card 131 and the information identifying the presenter section 132 allows card 131 to serve the dual purpose of acting as a business card and as a mailing label for document delivery. As illustrated in FIG. 7B, peelaway backing 138 may include instructions printed thereon, including an illustration 139 of an envelope with front card 137 adhered to the top right-hand edge of the envelope. The address of section 132 is thereby located toward the center of the envelope.

Although not illustrated in FIGS. 7A and 7B, optionally card 131 may include machine readable code, such as bar code, as previously described. Furthermore, such bar code may be printed on the front surface of front card 137 on an appended portion along the bottom edge of device 131, being separated therefrom by perforations which allow the recipient to tear the perforations if the bar code identification is not needed, such as if the front card 137 is to be adhered into the recipient's personal phone directory.

Figure 2A:
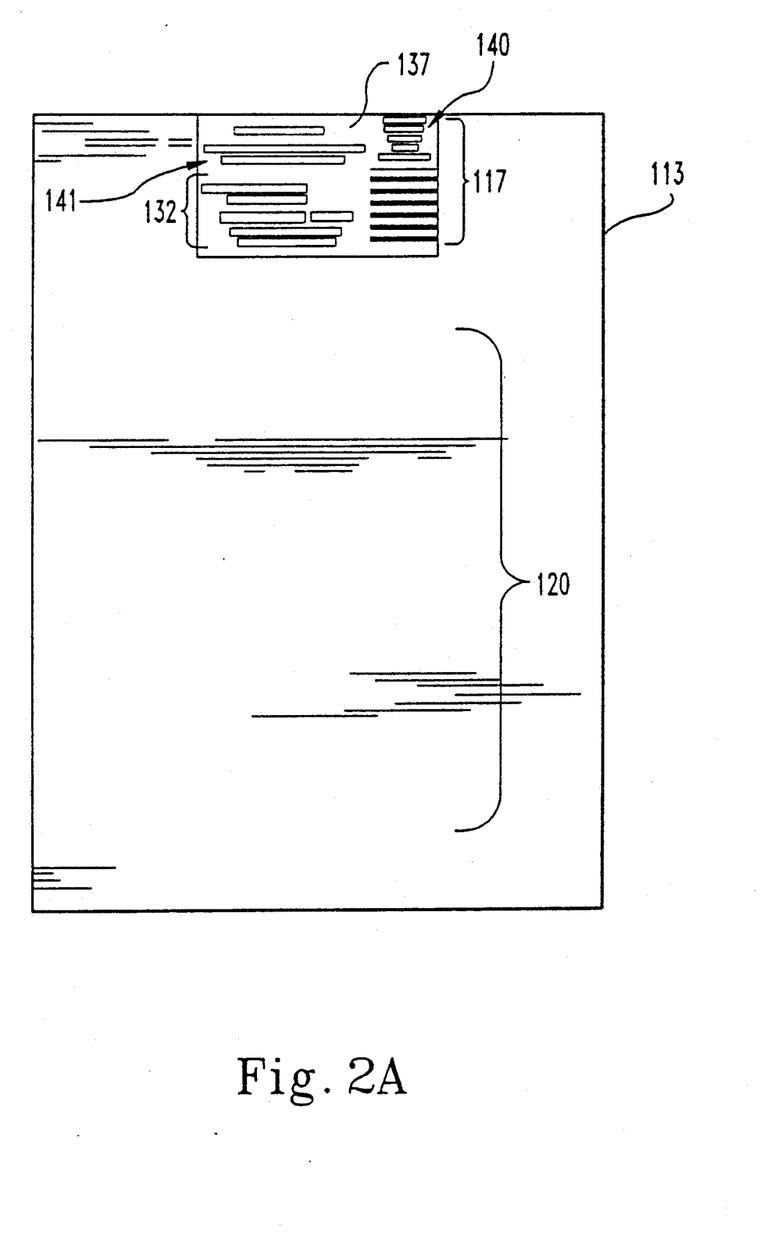
FIG. 2A is a front view of another embodiment of the present invention.

FIG. 2A illustrates an alternative embodiment of the document illustrated in FIG. 2, having card 137 acting as a mailing label, substituting for removal sticker 14 of FIGS. 1-4. Sticker 137 is adhered on document 113 atop the letterhead section 117 of document 113. Indicia 140 and 141 are provided as described above for the use of postal permits or other such debiting systems. Address section 132 is provided as previously described, and is preferably located in the lower left-hand corner. Letterhead section 117 on document 113 includes identification such as the name, address, zip code, phone number, and/or fax number underneath sticker 137 which is the same in content as the person identified in section 132 of sticker 137. Although optionally corresponding account indicia corresponding to indicia 140 and 141 may be provided on letterhead section 117 underneath sticker 137, typically it is not provided since typically document 113 is to be retained by the recipient. Document 113 includes main portion 120 in which a sender may print or write a message.

As described with the embodiment of FIGS. 1-4, sticker 137 overlies and is removable from the letterhead name and address which is the same as shown in address section 132 of removable sticker 137. Likewise, bar code or other machine readable code may optionally be utilized for document delivery sorting. It is understood that this machine readable code identification may use five-digit and/or nine-digit zip code identification.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A correspondence document comprising:
    a paper sheet including an addressor's section with a first addressor portion to identify the addressor by name and address in written words printed on said addressor's section;
    a removable paper sticker mounted atop and covering said first addressor's section and having a bottom surface and an outwardly facing top surface, said sticker having a return section thereon printed on said top surface of said sticker and identifying the addressor by name and address in pre-printed written words; and,
    adhesive means on said bottom surface of said sticker operable to allow said sticker to be removed from atop said first addressor's section of said paper sheet by the addressee and to then mount said sticker onto a return envelope utilizing the identity of the addressor in pre-printed written words on said sticker to mail to the envelope back to the addressor.
2. The correspondence document of claim 1 wherein: said removable sticker further has postal account indicia printed on an upper half of said top surface of said sticker, said account indicia providing account identification for payment of document delivery fees, such as postal fees, by the addressor, and further having indicia means printed on said top side of said sheet and complying with applicable postal carrier rules for indicating that the addressee is not required to pay said document delivery fees.

3. The correspondence document of claim 2 wherein: said return section identifying the addressor is located in a lower left-hand corner of said sticker, and wherein said account indicia is located in an upper half of said sticker.

4. The correspondence document of claim 3 and further comprising:
an envelope addressed to said addressee and containing said sheet and said sticker to be opened by said addressee with said sticker removable by said addressee and mounted to a return envelope supplied by said addressee.

5. A correspondence document comprising:
a letter sized paper sheet having a first letterhead section identifying the original sender by name and address and further having a message section to contain a message to the recipient;
a sticker removably mounted atop and covering said first letterhead section and concealing the same until removed, said sticker including a second identifying section identifying the same original sender by name and address in pre-printed written words; and,
adhesive means on said sticker operable to mount said sticker to said paper sheet but yieldable to allow said sticker to be removed from atop said addressor's section of said sheet exposing said first letterhead section and allowing said sticker to be remounted to a return envelope utilizing said second identifying section to identify said original sender on said return envelope.

6. The correspondence document of claim 5 wherein: said first letterhead section on said sheet including the same indicia as said second letterhead section on said sticker.

7. The correspondence document of claim 5 and further comprising:
a first envelope mailable to the recipient and containing said paper sheet and said sticker.

8. The correspondence document of claim 7 and further comprising:
a return envelope supplied by the recipient having an area to identify said original sender with said area sized to mountingly receive said sticker when removed from said sheet.

9. The correspondence document of claim 5 wherein: said removable sticker further has postal account indicia printed on said sticker, said account indicia providing account identification for payment of document delivery fees, such as postal fees, by the original sender, and further having indicia means printed on said sticker and complying with applicable postal carrier rules for indicating that the recipient is not required to pay said document delivery fees.

10. The correspondence document of claim 9 wherein:
said second identifying section on said sticker is located in a lower left-hand corner of said sticker, and wherein said account indicia is located in an upper half of said sticker.

11. A method of document communication comprising the steps of: providing a paper sheet having a first letterhead section identifying the original sender by name and address in written words printed on said letterhead section and further having a message section to contain a message to the original recipient;
mounting a sticker removably atop and covering said first letterhead section and concealing the same until removed, said sticker including a second letterhead section identifying the same original sender in pre-printed written words;
sending said paper sheet with said sticker mounted thereon in a first envelope to the recipient;
opening said first envelope;
removing said sticker from said paper sheet;
mounting said sticker onto a return envelope provided by the recipient; and,
sending said return envelope back to said original sender.

12. The method of communication of claim 11 comprising the additional steps of:
debiting an account of the original sender for the sending of said return envelope back to said original sender.

13. The method of claim 12 wherein said removable sticker further has postal account indicia printed on said sticker, said account indicia providing account identification for payment of document delivery fees, such as postal fees, by the original sender, and further having indicia means printed on said sticker and complying with applicable postal carrier rules for indicating that the recipient is not required to pay said document delivery fees.

14. The method of claim 13 wherein said second letterhead section on said sticker is located in a lower left-hand corner of said sticker, and wherein said account indicia is located in a upper half of said sticker, and wherein said step of mounting said sticker onto a return envelope comprises mounting said sticker in an upper right-hand corner of said return envelope.

15. The method of communication of claim 12 comprising the additional steps of:
locating said sticker in the addressee section on the return envelope; and,
inserting a communication into said return envelope prior to mailing said return envelope.

16. The method of claim 11 wherein said removable sticker further has postal account indicia printed on said sticker, said account indicia providing account identification for payment of document delivery fees, such as postal fees, by the original sender, and further having indicia means printed on said sticker and complying with applicable postal carrier rules for indicating that the recipient is not required to pay said document delivery fees.

17. The method of claim 16 wherein said second letterhead section on said sticker is located in a lower left-hand corner of said sticker, and wherein said account indicia is located in an upper half of said sticker, and wherein said step of mounting said sticker onto a return envelope comprises mounting said sticker in an upper right-hand corner of said return envelope.

* * * * *

UNITED STATES PATENT AND TRADEMARK OFFICE
CERTIFICATE OF CORRECTION

PATENT NO. : 5,232,248
DATED : August 3, 1993
INVENTOR(S) : Alex Talbott

It is certified that error appears in the above-identified patent and that said Letters Patent is hereby corrected as shown below:

In column 1, line 36, please change "recepient" to --recipient--.

Signed and Sealed this

Thirteenth Day of September, 1994

Attest:

BRUCE LEHMAN

*Attesting Officer*   *Commissioner of Patents and Trademarks*